(12) United States Patent
Zheng et al.

(10) Patent No.: US 12,222,772 B2
(45) Date of Patent: Feb. 11, 2025

(54) ROTATING SHAFT MECHANISM AND FOLDABLE ELECTRONIC DEVICE

(71) Applicant: GUANGDONG OPPO MOBILE TELECOMMUNICATIONS CORP., LTD., Guangdong (CN)

(72) Inventors: Zekuan Zheng, Guangdong (CN); Changchun Shi, Guangdong (CN); Qian Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 233 days.

(21) Appl. No.: 18/169,027

(22) Filed: Feb. 14, 2023

(65) Prior Publication Data
US 2023/0195181 A1 Jun. 22, 2023

Related U.S. Application Data

(63) Continuation of application No. PCT/CN2021/112562, filed on Aug. 13, 2021.

(30) Foreign Application Priority Data

Sep. 17, 2020 (CN) .......................... 202010981411.9

(51) Int. Cl.
  *G06F 1/16* (2006.01)
  *H04M 1/02* (2006.01)
(52) U.S. Cl.
  CPC .......... *G06F 1/1681* (2013.01); *G06F 1/1652* (2013.01); *H04M 1/0216* (2013.01); *H04M 1/022* (2013.01); *H04M 1/0268* (2013.01)
(58) Field of Classification Search
  CPC .. H04M 1/0216; H04M 1/0214; H04M 1/022; H04M 1/0268; G06F 1/1681; G06F 1/1652
  See application file for complete search history.

(56) References Cited

U.S. PATENT DOCUMENTS 10,036,188 B1 7/2018 Yao et al.
10,659,576 B1 5/2020 Hsu et al.
(Continued)

FOREIGN PATENT DOCUMENTS

CN 108648624 10/2018
CN 208656822 3/2019
(Continued)

OTHER PUBLICATIONS

WIPO, International Search Report and Written Opinion for PCT/CN2021/112562, Oct. 15, 2021.
(Continued)

*Primary Examiner* — Nidhi Thaker
(74) *Attorney, Agent, or Firm* — Hodgson Russ LLP

(57) ABSTRACT

An electronic device and a rotating shaft mechanism therefor are described. The rotating shaft mechanism includes a base and a rotating assembly rotatably connected to each other. The rotating assembly includes a support, a linkage member and a guide member. The support and the base are arranged in a spaced manner, and the linkage member is arranged between the base and the support. The linkage member includes a body and a driving portion arranged on the body, one end of the body being rotatably connected to the base, and another end of the body being slidably connected to the support. The guide member includes a connecting portion and a guiding portion. The connecting portion is arranged at one side of the support and is rotatably connected to the support. The guiding portion is arranged between the connecting portion and the support and is slidably connected to the driving portion.

20 Claims, 11 Drawing Sheets

(56) References Cited

U.S. PATENT DOCUMENTS

| | | | | |
|---|---|---|---|---|
| 11,194,366 | B2* | 12/2021 | Cheng | G06F 1/1626 |
| 11,336,759 | B2* | 5/2022 | Liao | H04M 1/022 |
| 11,467,633 | B2* | 10/2022 | Liao | F16C 11/04 |
| 11,640,188 | B2* | 5/2023 | Su | F16C 11/04 |
| | | | | 16/233 |
| 11,681,335 | B1* | 6/2023 | Hsu | G06F 1/1681 |
| | | | | 361/679.01 |
| 11,924,987 | B2* | 3/2024 | Lee | G06F 1/16 |
| 12,019,482 | B2* | 6/2024 | Feng | G06F 1/1616 |
| 12,147,276 | B2* | 11/2024 | Zheng | G06F 1/1681 |
| 2010/0041448 | A1* | 2/2010 | Gaddy | H04M 1/022 |
| | | | | 455/575.3 |
| 2015/0233162 | A1 | 8/2015 | Lee et al. | |
| 2020/0233466 | A1 | 7/2020 | Sanchez et al. | |
| 2020/0401193 | A1* | 12/2020 | Hsu | E05D 11/0054 |
| 2020/0409427 | A1* | 12/2020 | Hsu | G06F 1/1681 |
| 2021/0034117 | A1* | 2/2021 | Torres | G06F 1/1652 |
| 2021/0119171 | A1* | 4/2021 | Kim | H10K 50/84 |
| 2021/0165466 | A1* | 6/2021 | Kang | H04B 1/3833 |
| 2021/0271294 | A1* | 9/2021 | Liao | G06F 1/181 |
| 2021/0381289 | A1* | 12/2021 | Hsu | H04M 1/022 |
| 2022/0104370 | A1* | 3/2022 | Wu | H05K 5/0017 |
| 2022/0141981 | A1* | 5/2022 | Hsu | H05K 5/0226 |
| | | | | 16/337 |

FOREIGN PATENT DOCUMENTS

| | | | | |
|---|---|---|---|---|
| CN | 209327901 | | 8/2019 | |
| CN | 209375705 | | 9/2019 | |
| CN | 110428730 | | 11/2019 | |
| CN | 110428730 A | * | 11/2019 | G09F 9/301 |
| CN | 209591356 | | 11/2019 | |
| CN | 110714977 | | 1/2020 | |
| CN | 110784570 | | 2/2020 | |
| CN | 110784570 A | * | 2/2020 | G06F 1/1616 |
| CN | 111107189 | | 5/2020 | |
| CN | 210518418 | | 5/2020 | |
| CN | 111459225 | | 7/2020 | |
| CN | 111503458 | | 8/2020 | |
| EP | 2696257 A2 | * | 2/2014 | G06F 1/1652 |
| EP | 4145808 B1 | * | 8/2024 | E05D 7/04 |
| JP | 2020524327 | | 8/2020 | |
| JP | 2022531211 | | 7/2022 | |
| WO | 2020029062 | | 2/2020 | |
| WO | 2020082927 | | 4/2020 | |

OTHER PUBLICATIONS

CNIPA, First Office Action for CN Application No. 202010981411. 9, Jul. 4, 2022.

CNIPA, Notification to Grant Patent Right for Invention for CN Application No. 202010981411.9, Aug. 17, 2022.

EPO, Extended European Search Report for EP Application No. 21868366.2, Dec. 19, 2023.

JPO, Decision to Grant a Patent for JP Application No. 2023-515400, Mar. 5, 2024.

CNIPA, Notification to Grant Patent Right for Invention for CN Application No. 202211350581.2, Aug. 20, 2024.

* cited by examiner

ROTATING SHAFT MECHANISM AND FOLDABLE ELECTRONIC DEVICE

CROSS-REFERENCE TO RELATED APPLICATION(S)

The present application is a continuation of International Application No. PCT/CN2021/112562, filed Aug. 13, 2021, which claims priority to Chinese Patent Application No. 202010981411.9, filed Sep. 17, 2020, the entire disclosures of which are incorporated herein by reference.

TECHNICAL FIELD

The present application relates to the field of electronic devices, and particularly to rotating shaft mechanisms and foldable electronic devices.

BACKGROUND

In current foldable electronic devices, such as foldable cell phones, miniaturization of the cell phone is achieved by folding a display of the cell phone to make it easier for the user to carry. Conventional foldable cell phones typically include a first housing and a second housing pivotably connected to each other, and a flexible display that covers one side of the first housing and the second housing. The first housing and the second housing can be flipped to a stacked state, where the flexible display is folded. However, since edges of the flexible display are usually fixedly connected to the first housing and the second housing, when the flexible display is folded, a generally central area thereof will be subjected to a squeezing force from its edges and the first and second housings, and a support force from internal components of the electronic device. As a result, arching deformation occurs, and a direction of the arching deformation is opposite to the folding direction, such that the flexible display is prone to creasing or even peeling, which may easily lead to failure of the flexible display and reduction in the service life of the flexible display.

SUMMARY

Embodiments of the present application provide a foldable electronic device and a rotating shaft mechanism therefor.

In a first aspect, embodiments of the present application provide a rotating shaft mechanism for use in a foldable electronic device. The rotating shaft mechanism includes a base and a rotating assembly that are rotatably connected to each other; the rotating assembly includes a support, a linkage member and a guide member. The support is spaced apart from the base; the linkage member is arranged between the base and the support. The linkage member includes a body and a driving portion provided at the body; one end of the body is rotatably connected to the base, another end is slidably connected to the support. The guide member includes a connecting portion and a guiding portion. The connecting portion is arranged at one side of the support and is rotatably connected to the support. The guiding portion is arranged between the connecting portion and the support and is slidably connected to the driving portion of the linkage member.

In a second aspect, embodiments of the present application further provide a foldable electronic device including a rotating shaft mechanism, a first housing, a second housing, and a foldable screen. The rotating shaft mechanism includes a base and a rotating assembly that are rotatably connected to each other. The rotating assembly includes a support, a linkage member and a guide member. The support is spaced apart from the base. The linkage member is arranged between the base and the support. The linkage member includes a body and a driving portion provided at the body. One end of the body is rotatably connected to the base, another end is slidably connected to the support. The guide member includes a connecting portion and a guiding portion. The connecting portion is arranged at one side of the support and is rotatably connected to the support. The guiding portion is arranged between the connecting portion and the support and is slidably connected to the driving portion of the linkage member. The first housing is connected to the support. The second housing is connected to the base. The foldable screen is connected to the first housing and the second housing, and is stacked over the guide member.

In a third aspect, embodiments of the present application further provide a foldable electronic device including a rotating shaft mechanism, a first housing, and a second housing. The rotating shaft mechanism includes a base and two rotating assemblies that are rotatably connected to two opposite sides of the base respectively. Each rotating assembly includes a support, a linkage member, and a guide member. The support is spaced apart from the base. The linkage member is arranged between the base and the support. The linkage member includes a body and a driving portion provided at the body. One end of the body is rotatably connected to the base, another end is slidably connected to the support. The guide member includes a connecting portion and a guiding portion. The connecting portion is arranged at one side of the support and is rotatably connected to the support. The guiding portion is arranged between the connecting portion and the support and is slidably connected to the driving portion of the linkage member. The first housing is connected to the support of one of the two rotating assemblies, and the second housing is connected to the support of the other one of the two rotating assemblies.

BRIEF DESCRIPTION OF THE DRAWINGS

In order to illustrate technical solutions of the present application more clearly, a brief description of the accompanying drawings to be used in the embodiments will be introduced below. Apparently, the accompanying drawings in the following description only relate to some embodiments of the present application, and other accompanying drawings can be obtained from these drawings by those of ordinary skill in the art without creative effort.

DETAILED DESCRIPTION

Figure 1:
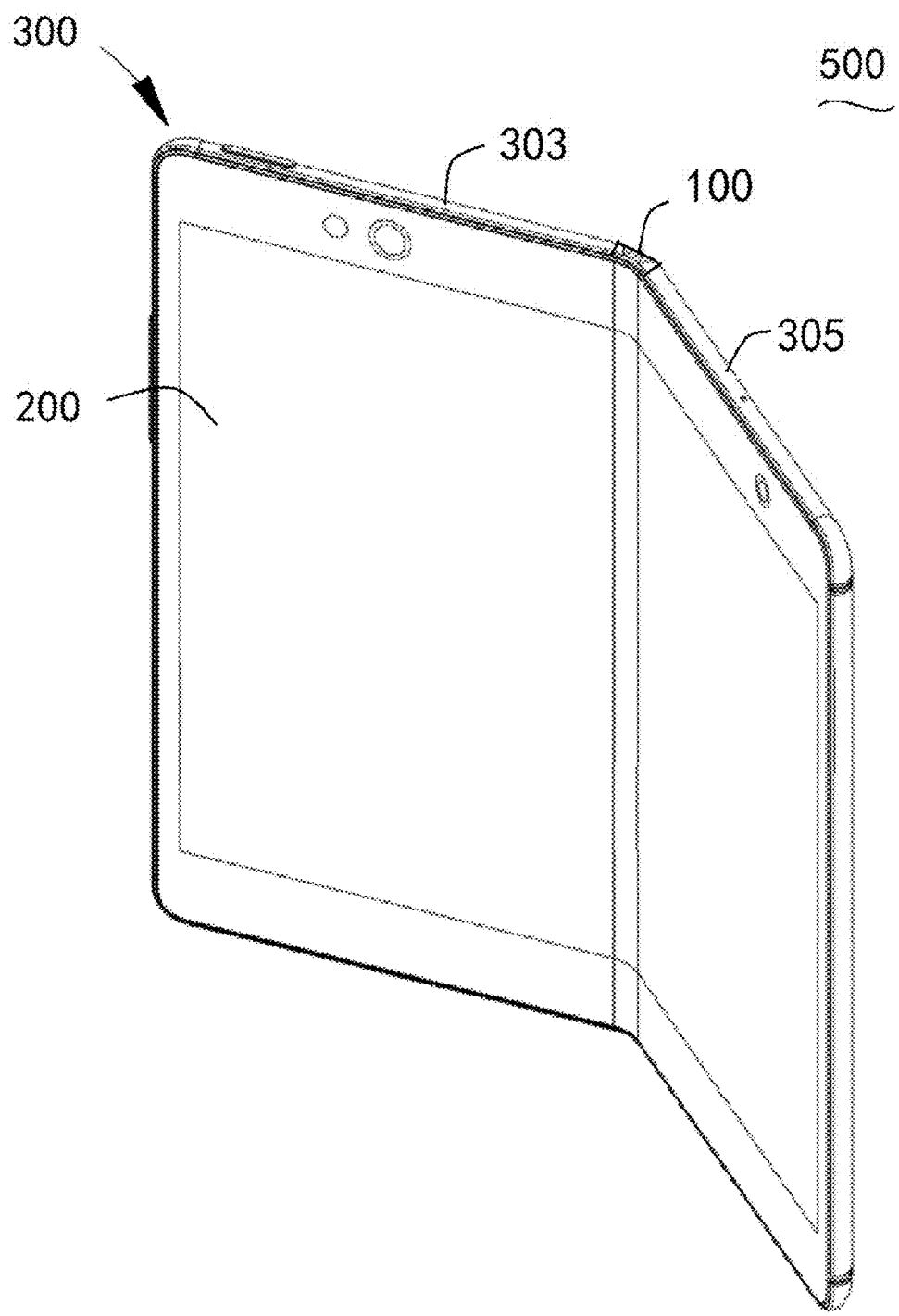
FIG. 1 is a schematic perspective view of an electronic device provided in the present application.

Technical solutions in the embodiments of the present application will be clearly and completely described in conjunction with the accompanying drawings in the embodiments of this application. Obviously, the described embodiments are only a part of the embodiments of this application, but not all of them. Based on the embodiments in the present application, all other embodiments obtained by a person of ordinary skill in the art without making creative effort fall within the scope of protection of this application.

A "communication terminal" (or simply "terminal") or an "electronic device", as used in the embodiments of the present application, includes, but is not limited to, a device that is configured to receive/transmit communication signals via a wired connection (e.g., via a public switched telephone network (PSTN), a digital subscriber line (DSL), a digital cable, a direct cable connection, and/or another data connection/network), and/or via a wireless interface (e.g., for a cellular network, a wireless local area network (WLAN), a digital television network such as a DVB-H network, a satellite network, an AM-FM radio transmitter, and/or of another communication terminal). The communication terminal configured to communicate through a wireless interface may be called a "wireless communication terminal", a "wireless terminal", and/or a "mobile terminal". Examples of mobile terminals or electronic devices include, but are not limited to: satellite or cellular telephones; personal communication system (PCS) terminals capable of combining cellular radio telephony with data processing, fax and data communication; PDA that can include radio telephones, pagers, Internet/Intranet access, web browsers, notepads, calendars, and/or global positioning system (GPS) receivers; and conventional lap-top and/or hand-held receivers, or other electronic devices that include a radiotelephone transceiver.

Current foldable electronic devices, such as cell phones, typically include a first housing and a second housing pivotably connected to each other, and a flexible display covering one side of the first housing and the second housing. The first housing and the second housing can be flipped to a stacked state, where the flexible display is folded. However, since edges of the flexible display are usually fixedly connected to the first and second housings, when the flexible display is folded, a generally central region thereof will be subjected to a squeezing force from its edges and the first and second housings, and a support force from internal components of the electronic device, such as the rotating shaft mechanism. As a result, arching deformation occurs.

In view of this, the inventors of the present application have devoted themselves to studying how to address the arching phenomenon of the flexible display, and to this end, the inventors propose a rotating shaft mechanism of the present application and a foldable electronic device applying such a rotating shaft mechanism. The rotating shaft mechanism includes a base and a rotating assembly rotatably connected to each other, and the rotating assembly includes a support, a linkage member and a guide member. The support is spaced apart from the base, and the linkage member is arranged between the base and the support. The linkage member includes a body and a driving portion provided at the body. One end of the body is rotatably connected to the base, the other end is slidably connected to the support. The guide member includes a connecting portion and a guiding portion. The connecting portion is arranged at one side of the support and is rotatably connected to the support. The guiding portion is arranged between the connecting portion and the support, and is slidably connected to the driving portion of the linkage member. The foldable electronic device includes a first housing, a second housing, a foldable screen, and a rotating shaft mechanism as described above. The first housing is connected to the support, the second housing is connected to the base. Alternatively, two rotating assemblies may be rotatably connected to two opposite sides of the base respectively, wherein the first housing is connected to the support of one of the two rotating assemblies, and the second housing is connected to the support of the other one of the two rotating assemblies. The first housing and the second housing are folded or unfolded through the relative rotation between the base and rotating assembly. The foldable screen is connected to the first housing and the second housing, and is stacked over the guide member.

In the electronic device and its rotating shaft mechanism provided in the present application, when the foldable screen is provided on the housing assembly and the rotating shaft mechanism, the first housing and the second housing can be rotated through the relative rotation between the base and the rotating shaft mechanism. At this point, the driving portion slides relative to the guiding portion to drive the guide member to rotate relative to the support, the guide member deflects when it rotates to form a certain "avoidance space". The avoidance space can prevent the rotating shaft mechanism from generating a resistance force or a support force on the backside of the foldable screen, and provides a space to accommodate a bending structure generated by the foldable screen during folding, so that the foldable screen can be avoided from a tendency to be deformed away from the rotating shaft mechanism, i.e., the foldable screen can deform concavely toward the rotating shaft mechanism in a natural bending state without external support for the arching. In this way, the foldable screen can be prevented from bending in a manner that is contrary to its natural bending tendency. Thus, the above-mentioned rotating shaft mechanism can protect the foldable screen when the foldable screen is folded, avoid damage to the foldable screen due to an irregular deformation of the foldable screen, and prolong the service life of the foldable screen.

The technical solutions in the embodiments of the present application will be clearly and completely described below in conjunction with the accompanying drawings in the embodiments of this application.

Referring to FIG. 1, an embodiment of the present application provides an electronic device 500. The electronic device 500 may be, but is not limited to, an electronic device such as a cell phone, a tablet computer, a smart watch, etc. The electronic device 500 in this embodiment is illustrated with a cell phone as an example.

Figure 2:
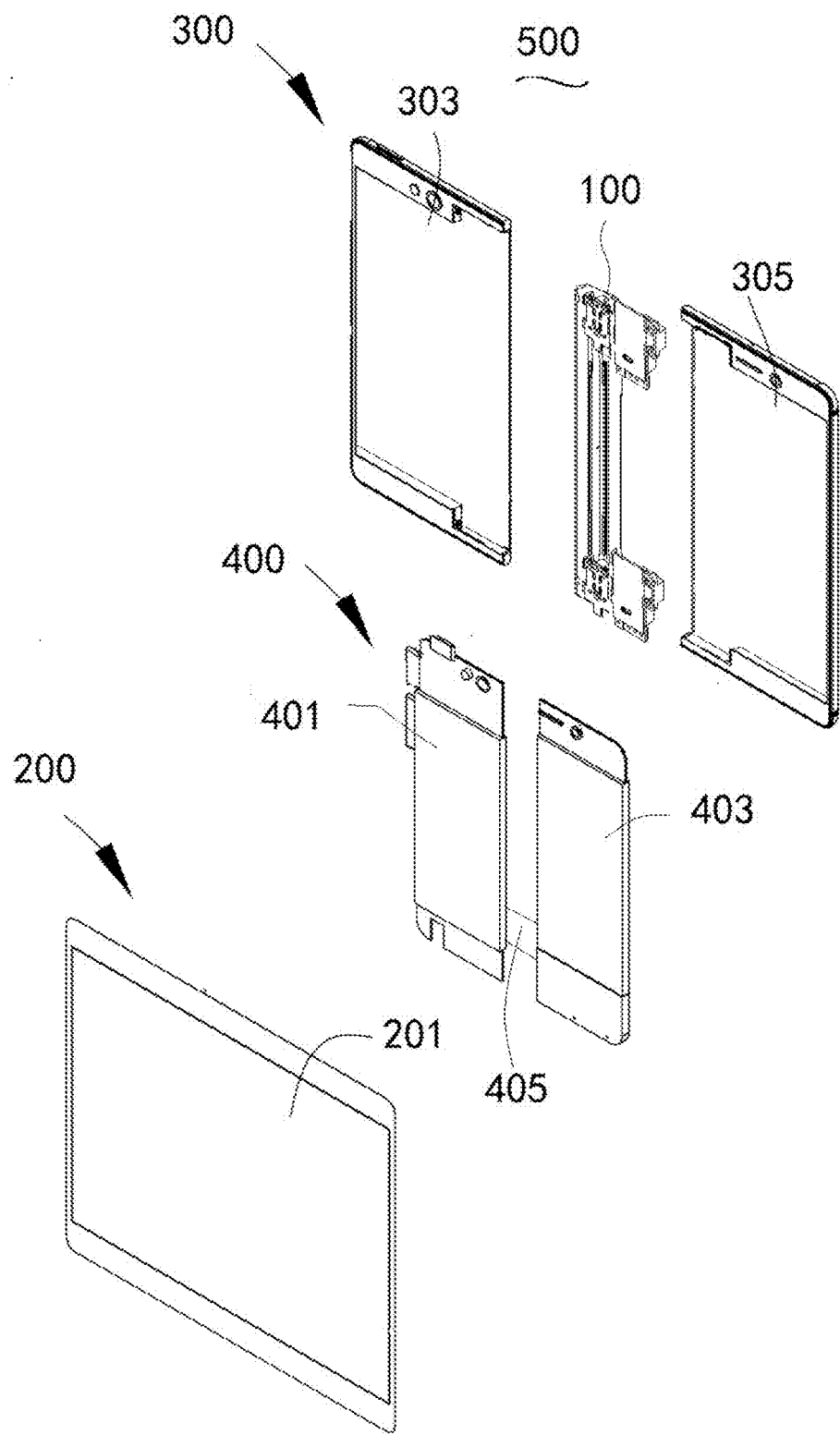
FIG. 2 is a schematic exploded view of the electronic device provided in the present application.

Referring to both FIG. 1 and FIG. 2, the electronic device 500 includes an electronic assembly 400, a housing assembly 300, a foldable screen 200, and a rotating shaft mechanism 100. The electronic assembly 400 is provided within the housing assembly 300, the rotating shaft mechanism 100 is connected with the housing assembly, and the foldable screen 200 is provided on the housing assembly 300 and the rotating shaft mechanism 100. The housing assembly 300 and the foldable screen 200 can be folded or unfolded via the rotating shaft mechanism 100. When the housing assembly 300 and the foldable screen 200 are folded, the size of the electronic device 500 is relatively small, which is easy to store and carry.

The housing assembly 300 includes a first housing 303 and a second housing 305, the first housing 303 and the second housing 305 being connected to two sides of the rotating shaft mechanism 100 respectively. The second housing 305 can be folded or unfolded relative to the first housing 303. The housing assembly 300 is configured to support the foldable screen 200, and protect the electronic assembly 400. The first housing 303 and the second housing 305 support two opposite ends of the foldable screen 200, respectively. The rotating shaft mechanism 100 can be folded or unfolded, and supports a portion of the foldable screen 200 located between two ends. In an embodiment, the first housing 303 can be a rigid housing, and the second housing 305 may also be a rigid housing. The first housing 303 and the second housing 305 can provide solid support for two ends of the flexible display 201.

The rotating shaft mechanism 100 may deform as the second housing 305 is folded or unfolded relative to the first housing 303. The rotating shaft mechanism 100 may restrict the second housing 305 from detaching from the first housing 303. The rotating shaft mechanism 100 is also configured to support the foldable screen 200 to prevent the foldable screen 200 from collapsing. The rotating shaft mechanism 100 connects the first housing 303 and the second housing 305 at two opposite sides thereof. The rotating shaft mechanism 100 makes use of its own rotatable characteristics to enable the first housing 303 to be flipped relative to the second housing 305, such that the first housing 303 is stacked, or is angled, or is unfolded relative to the second housing 305.

Figure 3:
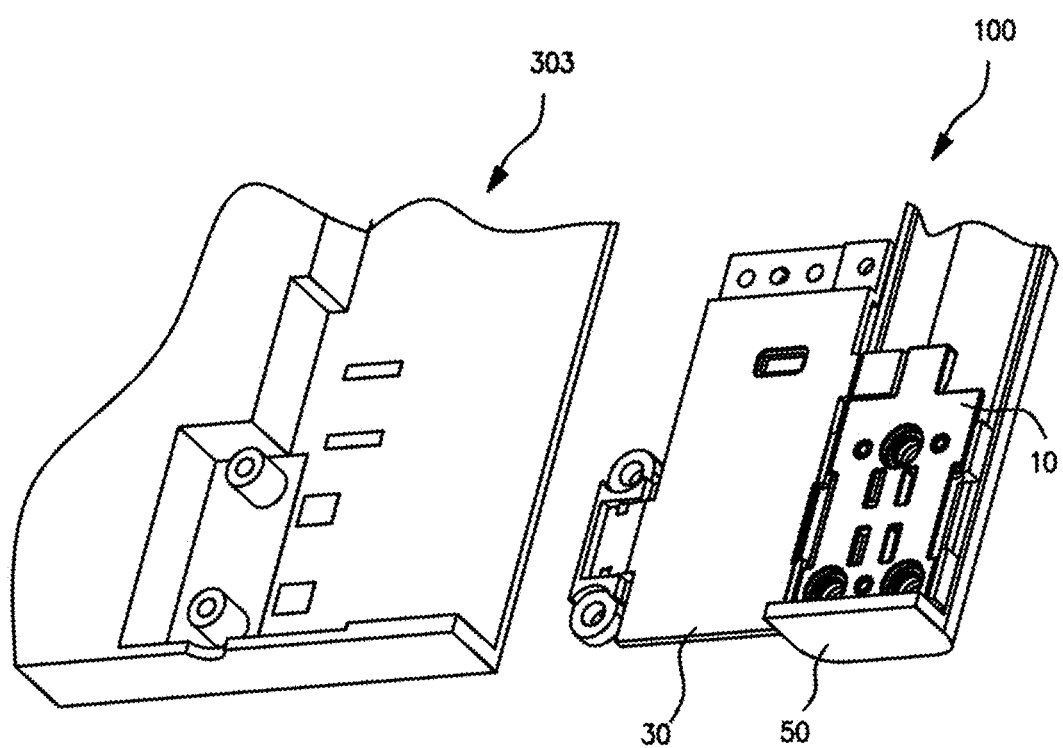
FIG. 3 is a schematic perspective view of the rotating shaft mechanism and the housing assembly of the electronic device shown in FIG. 2.

Referring to FIGS. 2 and 3, the rotating shaft mechanism 100 includes a base 10 and a rotating assembly 30 that are rotatably connected to each other. The rotating assembly 30 is connected to the housing assembly 300. The first housing 303 and the second housing 305 of the housing assembly 300 are rotated relative to each other through the relative rotation between the base 10 and the rotating assembly 30.

In this embodiment, there are two rotating assemblies 30 in the rotating shaft mechanism 100 (only one is shown in the figures), wherein the two rotating assemblies 30 are provided on two opposite sides of the base 10, and two rotating assemblies 30 are connected to the first housing 303 and the second housing 305, respectively. In other embodiments, there may be one rotating assembly 30 in the rotating shaft mechanism 100, wherein one of the first housing 303 and the second housing 305 is connected to the base 10, and the other one is connected to the rotating assembly 30. Embodiments according to the present specification are illustrated with two rotating assemblies 30 in an exemplary manner, and should not be considered limiting in any way. In this embodiment, the two rotating assemblies 30 are provided substantially symmetrically about the base 10, so that rotation states of the housing assembly 300 and the foldable screen 200 based on rotation of the rotating assembly 30 can be substantially symmetrical, and can have a symmetrical structure in the folded state, with a relatively small storage volume.

In some embodiments, the rotating shaft mechanism 100 can include only one rotating assembly 30 coupled to any position of the base 10. In some embodiments, the rotating shaft mechanism 100 can include a plurality of rotating assemblies 30 coupled to a same side of the base 10. In some embodiments, the rotating shaft mechanism 100 can include a plurality of rotating assemblies 30 coupled to two opposite sides of the base 10. A total number of the rotating assemblies 30 of the rotating shaft mechanism 100 is not limited, so long as two separate parts of the housing assembly 300 are relatively rotatably connected through the rotating shaft mechanism 100.

Figure 4:
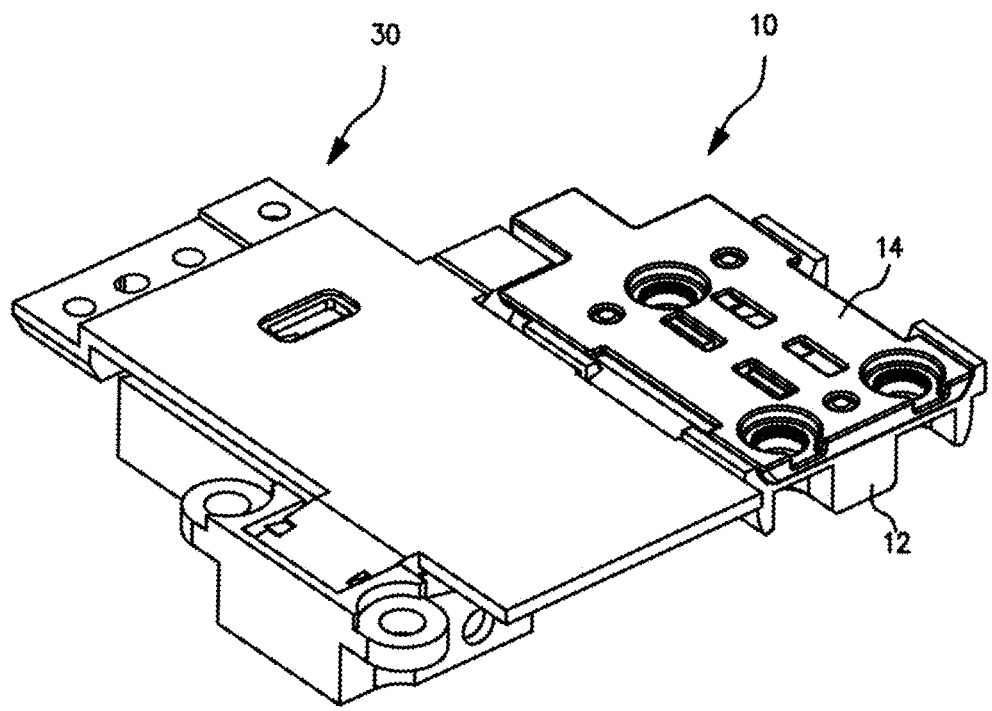
FIG. 4 is a schematic perspective view of the rotating shaft mechanism shown in FIG. 3.

Referring to FIG. 4, in this embodiment, the base 10 includes a seat 12 and a cover 14 stacked over the seat 12. The seat 12 and cover 14 collectively form a structure that is rotatably connected to the rotating assembly 30, to facilitate the installation of the rotating shaft mechanism 100.

Figure 5:
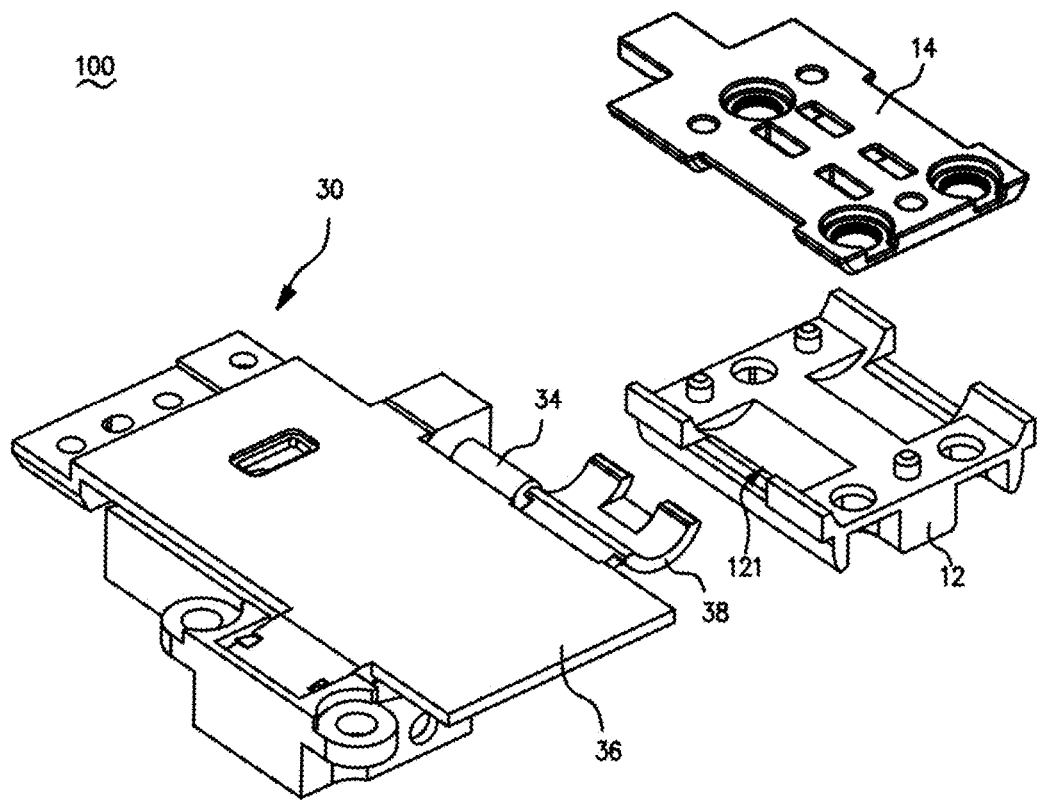
FIG. 5 is a schematic exploded view of the base of the rotating shaft mechanism shown in FIG. 4.

Referring to FIG. 5, in this embodiment, the seat 12 is substantially block-shaped. The seat 12 is provided with a recess 121 on a side facing the cover 14. The surface of the recess 121 is recessed relative to the surface of the remaining portion of the seat 12. The surface of the recess 121 can be an arcuate surface, which may be, for example, a surface of partially cylindrical structure, so as to fit a pivot structure of the rotating assembly 30.

Figure 6:
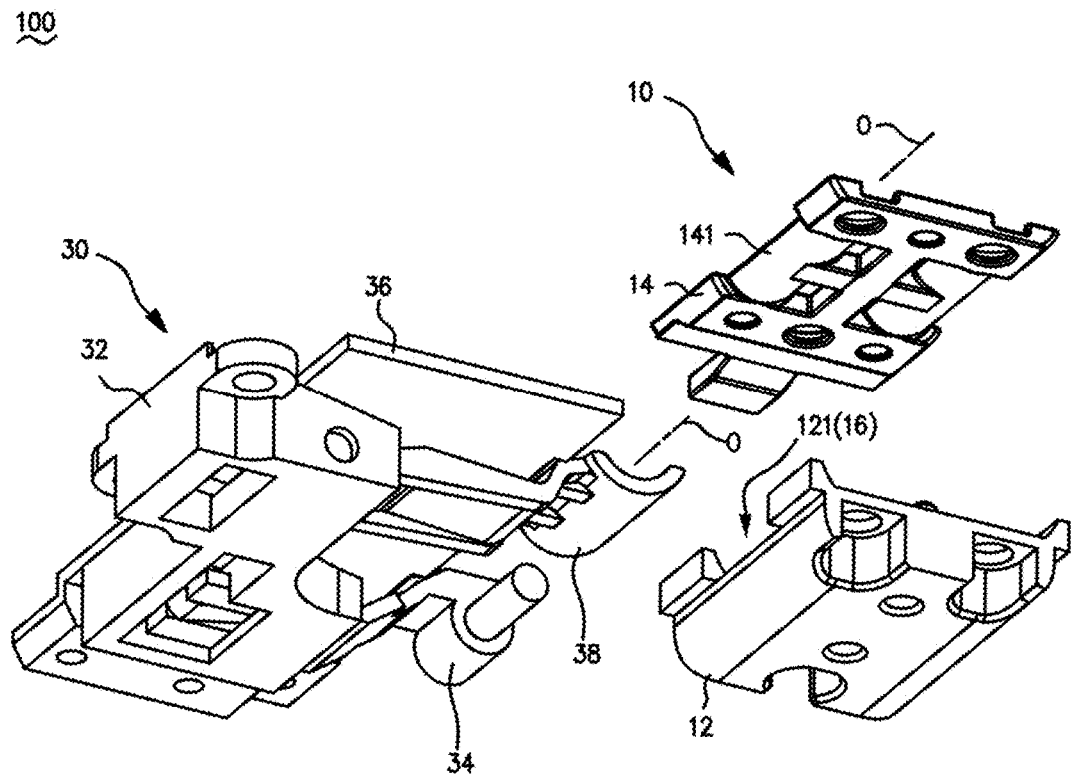
FIG. 6 is a schematic perspective view of the rotating shaft mechanism shown in FIG. 5 from another viewpoint.

Referring to FIG. 6, in this embodiment, the cover 14 is substantially plate-shaped. The cover 14 is provided with a mating surface 141 on a side facing the recess 121. The mating surface 141 is arranged opposite to, and apart from, the surface of the recess 121, to define a pivoting groove 16 together with the recess 121. The pivoting groove 16 is configured to accommodate a pivot structure of the rotating assembly 30, to allow the rotating assembly 30 to rotate relative to the base 10. The mating surface 141 can have a shape corresponding to that of the recess 121. In some embodiments, corresponding to the surface structure of the recess 121, the mating surface 141 is substantially an arcuate surface, which may be, for example, a surface of partially cylindrical structure. The mating surface 141 is substantially parallel to the surface of the recess 121 such that the pivoting groove 16 is generally a slot having a partially cylindrical cross-sectional profile. The pivoting groove 16 defines an axis of rotation O, and when the rotating assembly 30 rotates relative to the base 10, the rotating assembly 30 is substantially centered on the axis of rotation O.

Figure 7:
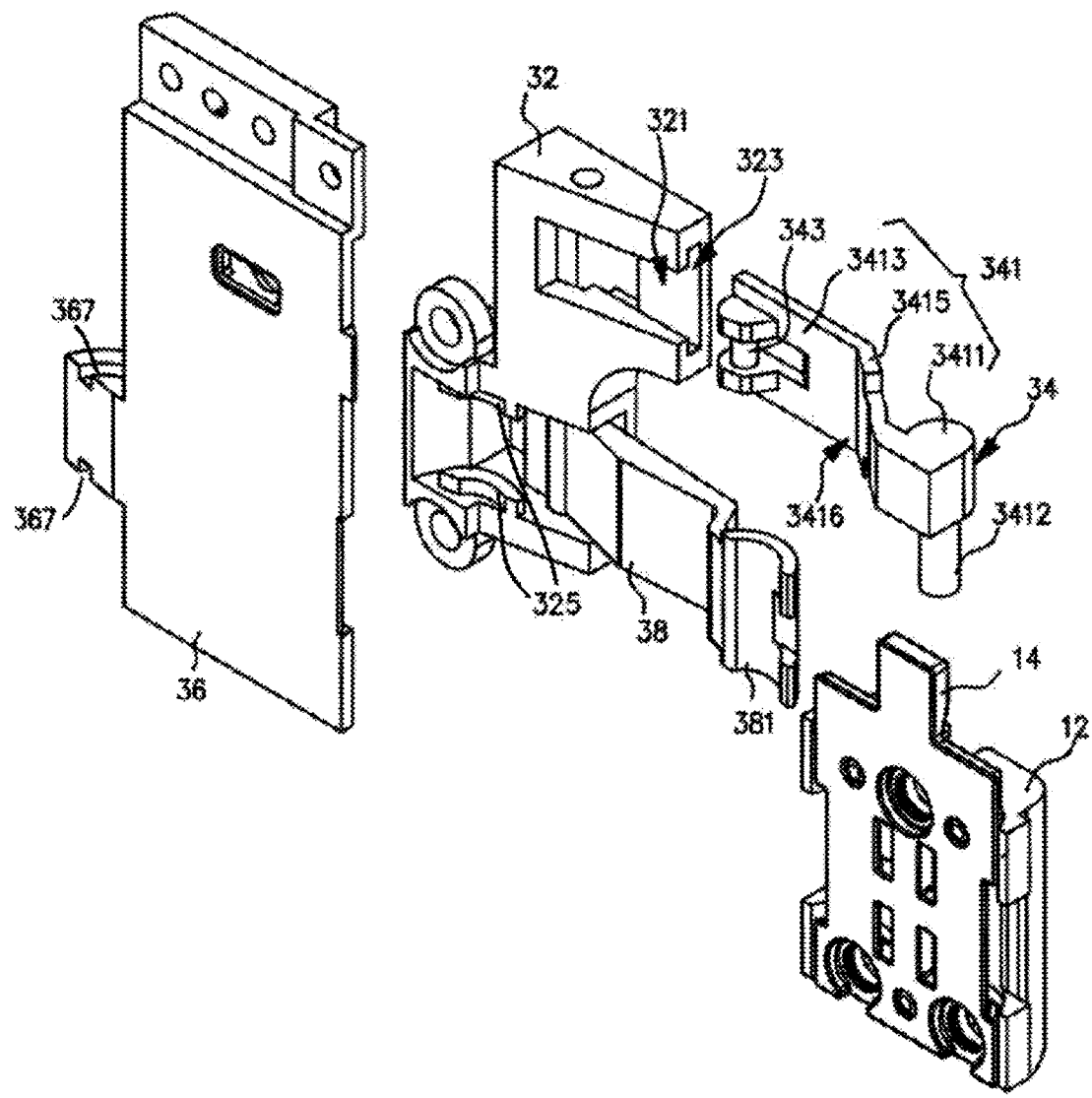
FIG. 7 is a schematic exploded view of the rotating assembly of the rotating shaft mechanism shown in FIG. 4.

Referring to FIG. 7, the rotating assembly 30 includes a support 32, a linkage member 34, and a guide member 36. The support 32 is spaced apart from the base 10. The linkage member 34 is movably arranged between the support 32 and the base 10. The guide member 36 is rotatably connected to the support 32 and slidably mates with the linkage member 34. When the base 10 and rotating assembly 30 are rotated relative to each other, the linkage member 34 drives the guide member 36 to rotate, as will be described below. In this way, the guide member 36 can rotate to a certain tilt angle relative to the base 10 when the rotating shaft mechanism 100 is folded, so as to provide a certain accommodation space for the bending of the foldable screen 200, thereby preventing the rotating shaft mechanism 100 from pushing the foldable screen 200 to make the foldable screen 200 arch. In this embodiment, the support 32 is connected to the first housing 303, for example, the support 32 can be fixed in the first housing 303 by fasteners such as screws, and the support 32 is located between the foldable screen 200 and the first housing 303. The support 32 is provided with a guiding groove 321, and the guiding groove 321 is configured to accommodate partial structure of the linkage member 34, whereby the linkage member 34 is slidably connected to the support 32. In this embodiment, the guiding groove 321 is substantially in a structure of straight slot, which runs through one side of the support 32 facing the base 10 to form an opening 323, and the linkage member 34 is allowed to pass through the opening 323. The guiding groove 321 extends in a direction substantially perpendicular to the axis of rotation O.

The linkage member 34 includes a body 341 and a driving portion 343 provided at the body 341. One end of the body 341 is rotatably connected to the base 10, and the other end is slidably connected to the support 32. In this embodiment, the body 341 includes a rotating portion 3411 and a sliding portion 3413, the rotating portion 3411 and the sliding portion 3413 being located at two opposite ends of the body 341.

The rotating portion 3411 is rotatably connected to the base 10, for example, the rotating portion 3411 is rotatably connected to the seat 12 of the base 10 via a first pivot 3412. The first pivot 3412 is received in a hole (not shown in the figures) provided at the base 10, and can rotate relative to the base. The structure of the first pivot 3412 is not limited, and may be a substantially shaft-like structure formed directly onto the rotating portion 3411, or may be a pivot, a pin, or the like independent from the rotating portion 3411. The structure of the hole provided at the base 10 is not limited, and may be a through-hole penetrating through the whole base, or a blind hole penetrating through a part of the base.

The sliding portion 3413 is slidably accommodated in the guiding groove 321 of the support 32. In some embodiments, the sliding portion 3413 can be in a shape of a flat plate. The sliding portion 3413 can be in other shape, so long as the sliding portion 3413 can be slidably accommodated in the guiding groove 321. When the base 10 drives the linkage member 34 to rotate, the sliding portion 3413 can slide within the guiding groove 321 to avoid structural interference during rotation, so that rotation of the rotating shaft mechanism 100 is smoother. In this embodiment, there are two sliding portions 3413, and the two sliding portions 3413 are provided opposite to and apart from each other, and the two sliding portions 3143 are collectively configured to fix the driving portion 343. In some other embodiments, a structure between the sliding portion 3413 and the guiding groove 321 may be replaced by other forms of guiding structures, for example, the support 32 may be provided with a structure such as a guiding groove, a guiding hole. The sliding portion 3413 can slidably fit into the guiding groove, guide hole. Alternatively, the slidable fitting between the sliding portion 3413 and the support 32 can be achieved in the form of a guide rail and a guiding groove.

In some embodiments, the body 341 may further include an avoidance portion 3415, which is connected between the rotating portion 3411 and sliding portion 3413. In this embodiment, the avoidance portion 3415 is bent relative to the sliding portion 3413 to form, together with the sliding portion 3413, an accommodation space 3416 for accommodating the guide member 36. When the linkage member 34 drives the guide member 36 to rotate relative to the support 32, the guide member 36 is tilted relative to the linkage member 34, and the accommodation space 3416 provides sufficient motion space for the guide member 36 to avoid structural interference with the movement of the guide member 36 and to make an overall structure of the rotating shaft mechanism 100 more compact.

The driving portion 343 is connected to the sliding portion 3413, and the driving portion 343 is configured to drive movement of the guide member 36. In this embodiment, the driving portion 343 is substantially columnar in shape, and connected between two sliding portions 3413. In this way, a space formed between the two sliding portions 3413 can slidably fit with the guide member 36, and avoid interference with the movement of the guide member 36, thereby making the fitting structure more compact.

Figure 8:
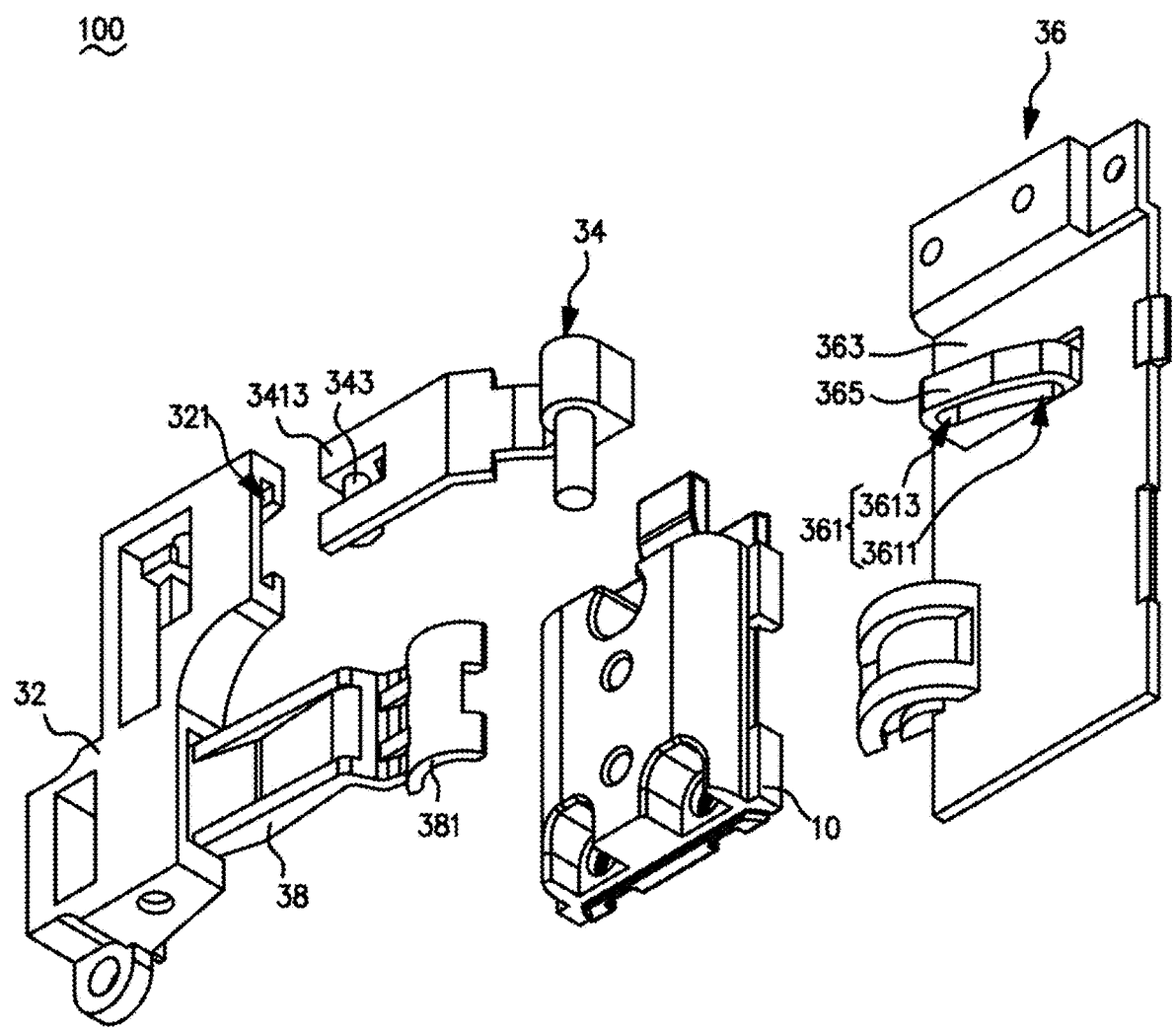
FIG. 8 is a schematic exploded view of the rotating shaft mechanism shown in FIG. 7 from another viewpoint.
Figure 9:
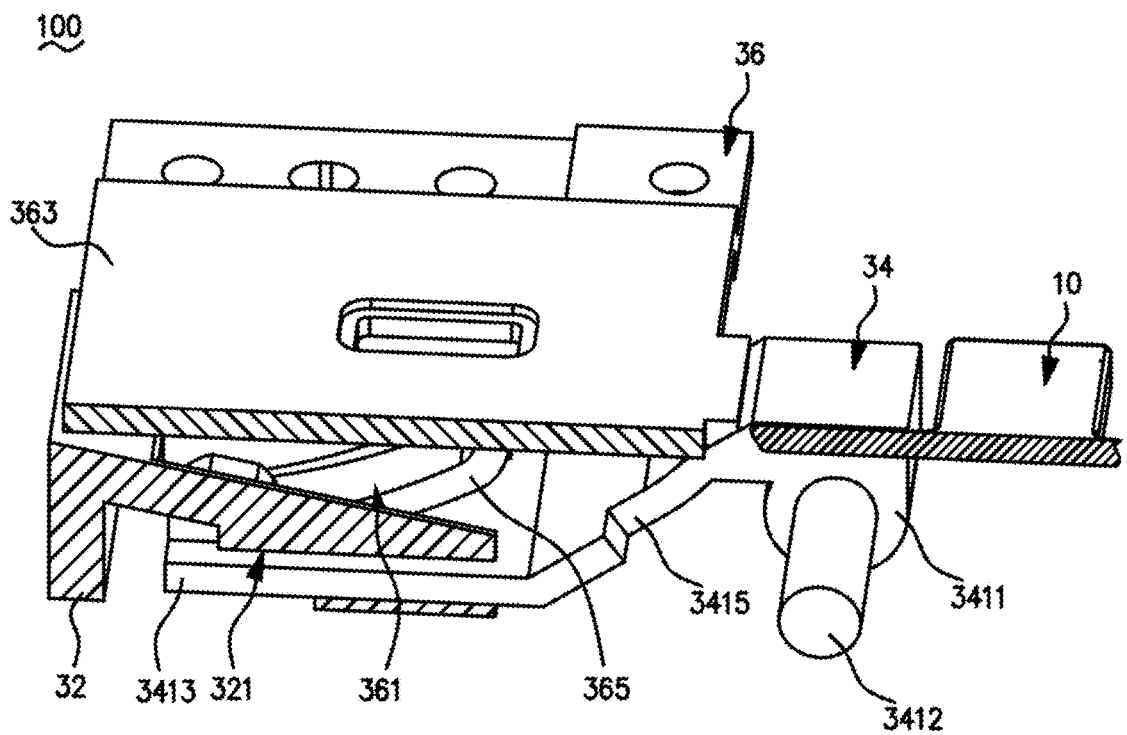
FIG. 9 is a schematic perspective cross-sectional view of the rotating shaft mechanism shown in FIG. 3 along a first plane.

Referring to FIGS. 8 and 9, the guide member 36 is provided on one side of the support 32 facing the foldable screen 200. The guide member 36 is provided with a sliding groove 361 for slidably mating with the driving portion 343. The driving portion 343 is at least partially accommodated in the sliding groove 361. When the base 10 and the rotating assembly 30 are rotated relative to each other, the driving portion 343 slides in the sliding groove 361 to drive the guide member 36 to rotate and tilt relative to the support 32.

Further, the guide member 36 includes a connecting portion 363 and a guiding portion 365.

In this embodiment, the connecting portion 363 is, provided on one side of the support 32 facing the foldable screen 200, and is rotatably connected to the support 32. Referring to FIG. 7, the guide member 36 is provided with an arcuate groove 367 on one side away from the the foldable screen 200, while the support 32 is provided with an arcuate protrusion 325. The arcuate protrusion 325 is nested within the arcuate groove 367 and is rotatably mating with the arcuate groove 367, such that the guide member 36 is rotatable relative to the support 32. In this embodiment as shown, there are two opposite arcuate grooves 367 on the guide member 36, and two arcuate protrusions 325 opposite to each other and corresponding to the two arcuate grooves 367 are provided on the support 32. In some embodiments, there may be only one arcuate groove 367 on the guide member 36, and there may be one arcuate protrusion 325 on the support 32. Also, the arcuate groove may be provided on the support 32, while the arcuate protrusion may be provided on the guide member 36, so long as the guide member 36 can be rotated relative to the support 32 about a single axis.

In some embodiments, the connecting portion 363 may be substantially plate-shaped. The connecting portion 363 can be used to support the foldable screen 200 to present the foldable screen 200 from collapsing in the unfolded state. The rotating and sliding connection among the guide member 36, the linkage member 34, the support 32 and the base 10 enables the rotating shaft mechanism 100 to be set directly on the non-display side (i.e., the backside) of the foldable screen 200 and to support the foldable screen 200, preventing the rotating shaft mechanism 100 from being set on peripheral edges of the foldable screen 200 and occupying a bezel space of the electronic device 500, which is conducive to achieving a larger screen-to-body ratio.

In some embodiments, one side of the connecting portion 363 away from the support 32 may be fixedly connected (e.g., attached, etc.) to the foldable screen 200. When the connecting portion 363 is rotated and tilted, it can drive the foldable screen 200 to bend in a direction towards the rotating shaft mechanism 100, playing a guidance role for the bending state of the foldable screen 200. The foldable screen 200 bends in a predetermined direction in a folded state, so as to avoid abnormal arching or bending deformation of the foldable screen 200 when it is folded.

The guiding portion 365 is arranged between the connecting portion 363 and the support 32. The sliding groove 361 is provided in the guiding portion 365 to allow the guiding portion 365 to slidably mate with the driving portion 343 of the linkage member 34. The guiding portion 365 is connected to one side of the connecting portion 363 facing the support 32, and protrudes relative to the surface of the connecting portion 363. The guiding portion 365 is at least partially accommodated in a space between two sliding portions 3413, and the driving portion 343 passes through the sliding groove 361 to allow for a more compact mating structure between the guide member 36 and the linkage member 34.

In some embodiments, the driving portion 343 may be implemented in the form of a sliding groove, while the guiding portion 365 may be provided with a guiding post. The guiding post is at least partially received in the sliding groove, so that the guiding post is slidably movable relative to the sliding groove. When the first housing 303 and the second housing 305 rotate relative to each other via the relative rotation between the base 10 and the rotating shaft mechanism 100, the guiding post provided at the guiding portion 365 would slide relative to the sliding groove at the driving portion to drive the guide member to rotate relative to the support. As will be appreciated to those skilled in the art, the driving portion 343 and the guiding portion 365 may be interchanged.

Figure 10:
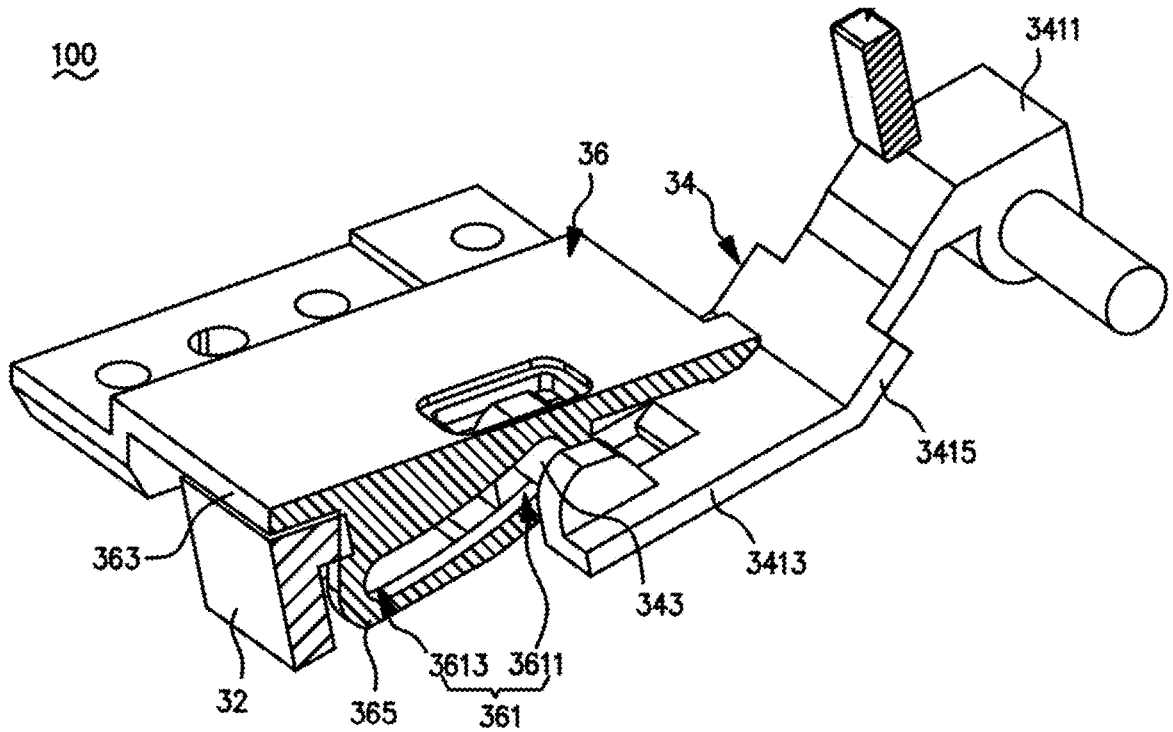
FIG. 10 is a schematic perspective cross-sectional view of the rotating shaft mechanism shown in FIG. 3 along a second plane.

Referring to FIG. 10, in this embodiment, the sliding groove 361 in the guiding portion 365 is generally a slot set at an angle relative to the connecting portion 363. The sliding groove 361 has a first end 3611 adjacent to the base 10, and a second end 3613 that is opposite to the first end 3611 and away from the base 10. That is, the second end is further away from the base 10 than the first end. The first end 3611 and the second end 3613 collectively define an extension direction of the sliding groove 361, i.e., the extension direction of the sliding groove 361 may be understood as a direction pointing from the first end 3611 to the second end 3613, or may be understood as a direction pointing from the second end 3613 to the first end 3611. The extension direction of the sliding groove 361 is substantially the same as the extension direction of the guiding groove 321, both extending from the support 32 toward the base 10. In some embodiments, the extension direction of the sliding groove 361 is substantially set at an angle relative to the connecting portion 363, such that the driving portion 343, when sliding in the sliding groove 361, can slide between the first end 3611 and the second end 3613 to drive the connecting portion 363 to rotate and incline.

As shown in FIG. 10, a distance between the first end 3611 and the connecting portion 363 is less than a distance between the second end 3613 and the connecting portion 363, based on the inclined structure of the sliding groove 361, so that when the rotating shaft mechanism 100 is folded, the linkage member 34 rotates relative to the base 10 and moves in a direction away from the support 32, and the driving portion 343 slides from the second end 3613 to the first end 3611, thereby driving the guide member 36 to rotate and incline relative to the support 32.

Figure 11:
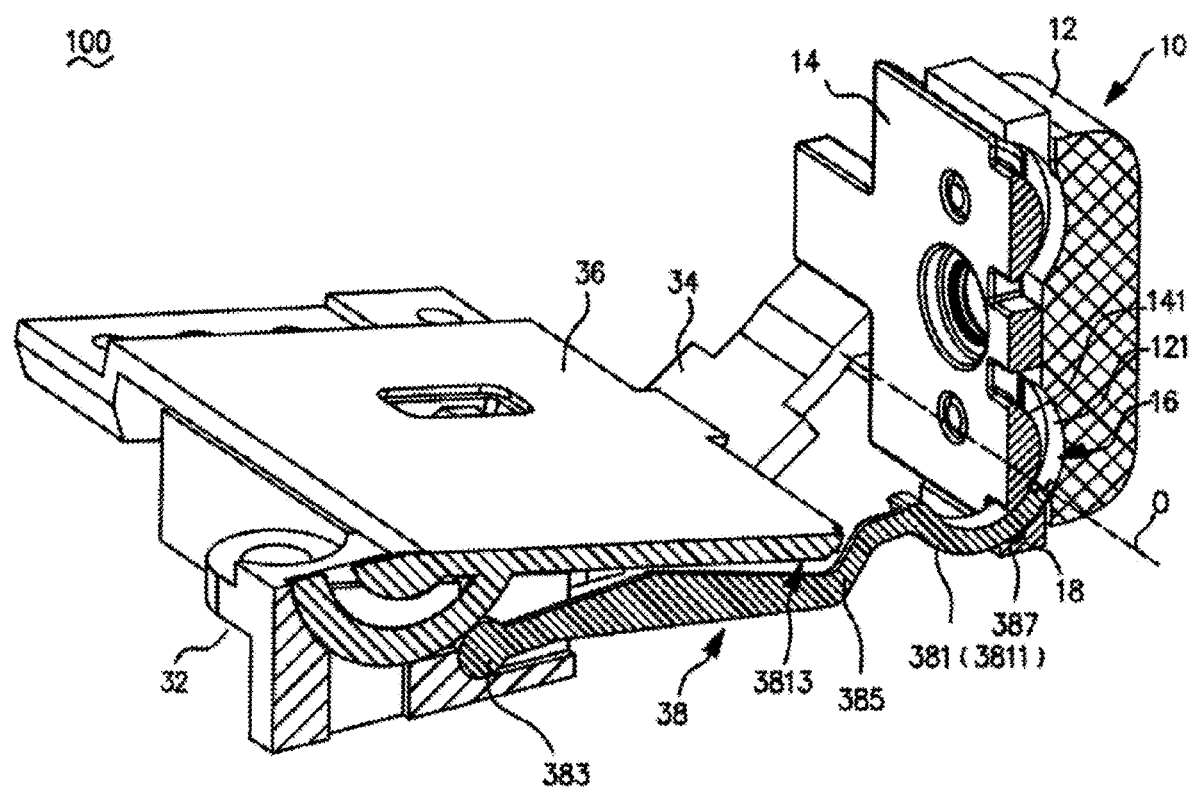
FIG. 11 is a schematic perspective cross-sectional view of the rotating shaft mechanism shown in FIG. 3 along a third plane.

Referring to FIG. 11, in some embodiments, the rotating assembly 30 may further include a connecting member 38, one end of which is rotatably connected to the base 10 and the other end of which is rotatably connected to the support 32, to maintain the relative position between the base 10 and the support 32 substantially unchanged and to facilitate improved stability of rotation of the rotating shaft mechanism 100. In this embodiment, the connecting member 38 and the linkage member 34 are arranged substantially side by side, and the connecting member 38 is rotatably connected to the base 10 via a second pivot 3811. The second pivot 3811 is arranged substantially coaxially with the first pivot 3412, whereby the connecting member 38 and the linkage member 34 are connected to the base 10 substantially coaxially. In this way, rotation of the connecting member 38 does not interfere with rotation of the linkage member 34, such that rotations of multiple members of the rotating shaft mechanism 100 can be consistent during rotation, and the members are not dislocated causing damage to the foldable screen 200. It should be understood that in this application, "side by side" should be instructed that the two are set approximately apart, commonly referred to as "abreast", and are not required to be set apart on the same plane. For example, an edge of the connector 38 can be spaced from an edge of the linkage member 34, and when the rotating assembly 30 is rotated, either one of the connecting member 38 and the linkage member 34 can rotate, while the relative distance between them may remain fixed.

In this embodiment, the connecting member 38 and linkage member 34 are provided substantially side by side, the guide member 36 is arranged on the same side of the connecting member 38 and linkage member 34. One side of the connecting member 38 facing the guide member 36 is provided with an avoidance space 3813. The avoidance space 3813 is configured to partially accommodate the guide member 36. When the linkage member 34 drives the guide member 36 to rotate relative to the support 32, the guide member 36 is tilted relative to the linkage member 34, and the avoidance space 3813 can provide sufficient motion space for the guide member 36 to avoid structural interference with the movement of the guide member 36, and can make the overall structure of the rotating shaft mechanism 100 more compact.

In this embodiment, the connecting member 38 may include a first pivot portion 381, a second pivot portion 383, and a transition portion 385 connected between the first pivot portion 381 and the second pivot portion 383. The first pivot portion 381 is rotatably connected to the base 10, the second pivot portion 383 is rotatably connected to the support 32, and the transition portion 385 has a bent structure to form the above-described avoidance space 3813. It should be understood that the designations "first pivot portion", "second pivot portion" shall not limit specific structure of the connecting portion 38. For example, the first pivot portion 381 and second pivot portion 383 should be understood as parts of the connecting portion 38 with rotary connection, which can also be collectively called "pivot portion". In order to describe the connection relationship between the connecting portion 38 and the base 10 as well as the support 32, the terms "first pivot portion" and "second pivot portion" are used to distinguish the parts having a rotary connection.

In some embodiments, the first pivot portion 381 may serve as the above-described second pivot 3811 for achieving a rotational connection between the connecting portion 38 and the base 10. The first pivot portion 381 has an arcuate structure and is slidably accommodated in the pivoting groove 16 of the base 10, and when the first pivot portion 381 slides in the pivoting groove 16, the connecting member 38 rotates based on the axis of rotation O. Specifically, in the illustrated embodiment, the first pivot portion 381 may substantially be partially cylindrical, and may also be considered as being rotatably accommodated in the pivoting groove 16. Two surfaces of the first pivot portion 381 that run from each other are provided opposite to the recess 121 and the mating surface 141, respectively. For example, the surface of the first pivot portion 381 can be substantially superimposed on the recess 121 and the mating surface 141, so as to prevent the first pivot portion 381 from loosening when it rotates in the pivoting groove 16, thereby providing a smoother rotation of the rotating shaft mechanism 100.

In some embodiments, the connecting member 38 may further include a positioning portion 387, which is provided on the first pivot portion 381, and which is used for mating with a structure of the base 10 to achieve fixing of a relative angle between the rotating assembly 30 and the base 10. Accordingly, the base 10 may further include a mating portion 18, which may be provided in the pivoting groove 16 for embedding fitting with the positioning portion 387 to fix an angle between the rotating assembly 30 and the base 10. Specifically, the positioning portion 387 may be a raised structure protruding from the surface of the first pivot portion 381, and the mating portion 18 may be a recessed structure provided in the recess 121 or a recessed structure provided in the mating surface 141. When the first pivot portion 381 slides in the pivoting groove 16, the positioning portion 387 may selectively embedding fits with the mating portion 18. When there is no external force, the positioning portion 387 may be stably accommodated in the mating portion 18, such that the angle between the rotating assembly 30 and the base 10 can be fixed. In some embodiments, there can be a plurality of positioning portions 387 or/and mating portions 18, and the plurality of positioning portions 387 or/and mating portions 18 may be spaced along the direction of rotation of the first pivot portion 381, i.e., spaced along the direction around the axis of rotation O, so as to achieve fixing of multiple angles between the rotating assembly 30 and the base 10. In other embodiments, the recessed and raised structures between the positioning portion 387 and the mating portion 18 can be interchanged, for example, the positioning portion 387 is recessed and the mating portion 18 is raised, etc., so long as the two can cooperate with each other to achieve angular positioning between the rotating assembly 30 and the base 10, which will not be repeated in this specification.

Figure 12:
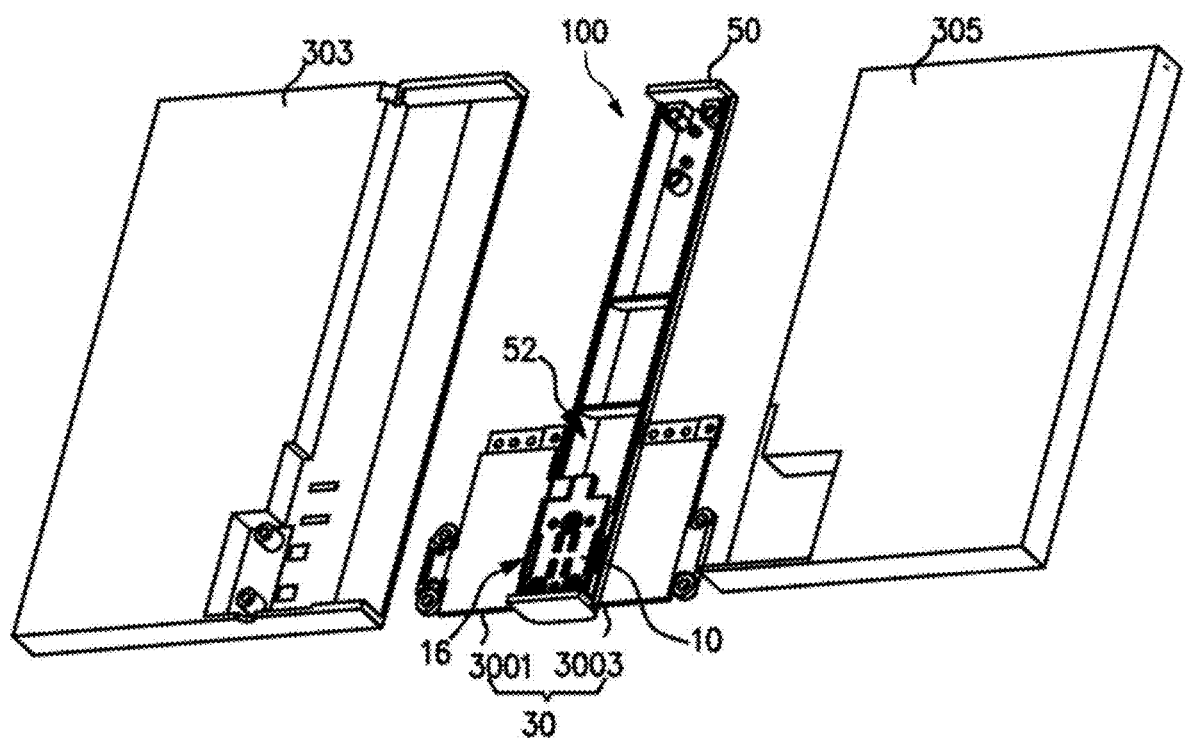
FIG. 12 is a schematic perspective view of the housing assembly and the rotating shaft mechanism of the electronic device shown in FIG. 1.

FIG. 12 is a structural schematic view of the rotating shaft mechanism 100, illustrating a general structure of the rotating shaft mechanism 100 and housing assembly 300 in a modular drawing way, and serve as no structural limitation on the electronic device 500 in the embodiments of this application. In this embodiment, the rotating shaft mechanism 100 further includes a rotating shaft housing 50, which is configured to accommodate the base 10 to provide overall protection for the rotating shaft mechanism 100, and to form a modular assembly scheme that facilitates the transportation and well as assembly. Specifically, the rotating shaft housing 50 is provided with an accommodation cavity 52. The base 10 is provided in the accommodation cavity 52 and can be secured to the rotating shaft housing by fasteners such as screws. In some embodiments, the rotating shaft housing 50 may also serve as a housing assembly of the electronic device 500, and form a cosmetic surface of the electronic device 500 together with the first housing 303 and the second housing 305, when the first housing 303 and the second housing 305 are provided on opposite sides of the rotating shaft housing 50 respectively.

In this embodiment, one rotating shaft mechanism 100 may include two rotating assemblies 30, i.e., a first rotating assembly 3001 and a second rotating assembly 3003, which are arranged on two opposite sides of the base 10 respectively and are substantially symmetrically arranged about the base 10. The first rotating assembly 3001 is connected to the first housing 303, and the second rotating assembly 3003 is connected to the second housing 305. Accordingly, the pivoting groove 16 of the base 10 may also be implemented as two, wherein one pivoting groove 16 is used to accommodate the first pivot portion 381 of the first rotating assembly 3001, and the other pivoting groove 16 is used to accommodate the first pivot portion 381 of the second rotating assembly 3003. The first rotating assembly 3001 and the second rotating assembly 3003 can rotate relative to the base 10 under an external force to be in a folded state close to each other or in an unfolded state away from each other, so that the first housing 303 and the second housing 305 can be folded or unfolded relative to each other in a relatively smoother way, and have a relatively small size when folded. The electronic device 500 may include a plurality of rotating shaft mechanisms 100. The plurality of rotating shaft mechanisms 100 are arranged sequentially along the direction of their rotation axis O, and are connected to the first housing 303 and the second housing 305 to make rotation of the electronic device 500 more balanced and stable.

In other embodiments, one rotating shaft mechanism 100 may include only one rotating assembly 30, and two rotating shaft mechanisms 100 can be employed to achieve a rotational connection between the first housing 303 and the second housing 305, when assembled to the housing assembly 300 of the electronic device 500. For example, one of the rotating shaft mechanisms 100 can have the rotating assembly 30 connected to the first housing 303 and the base 10 connected to the second housing 305, and the other rotating shaft mechanism 100 can have the rotating assembly 30 connected to the second housing 305. Of course, there can be a plurality of rotating shaft mechanisms 100, for example, four, six, eight, etc., to make rotation of the electronic device 500 more balanced and stable.

Referring again to FIG. 2, the electronic assembly 400 includes a first electronic module 401, a second electronic module 403, and a flexible circuit board 405. The first electronic module 401 is provided in the first housing 303, the second electronic module 403 is provided in the second housing 305, and the flexible circuit board 405 is electrically connected to the first electronic module 401 and second electronic module 403. In some embodiments, the first electronic module 401 may be a main board, and a central processor, memory, antenna, camera and receiver provided on the main board, etc. The second electronic module 403 may consist of a printed circuit board and a functional module provided on the printed circuit board. The second electronic module 403 is different from the first electronic module 401, and the second electronic module 403 may be a battery, a connector, a fingerprint module, etc.

The foldable screen 200 is laid on the first housing 303, the rotating shaft mechanism 100 and the second housing 305 in series. In this embodiment, the foldable screen 200 includes a flexible display 201. The flexible display 201 is bent or unfolded as the first housing 303 and the second housing 305 are flipped over each other. The flexible display 201 is electrically connected to the electronic assembly 400, to enable the electronic assembly 400 to control operation of the flexible display 201.

Figure 13:
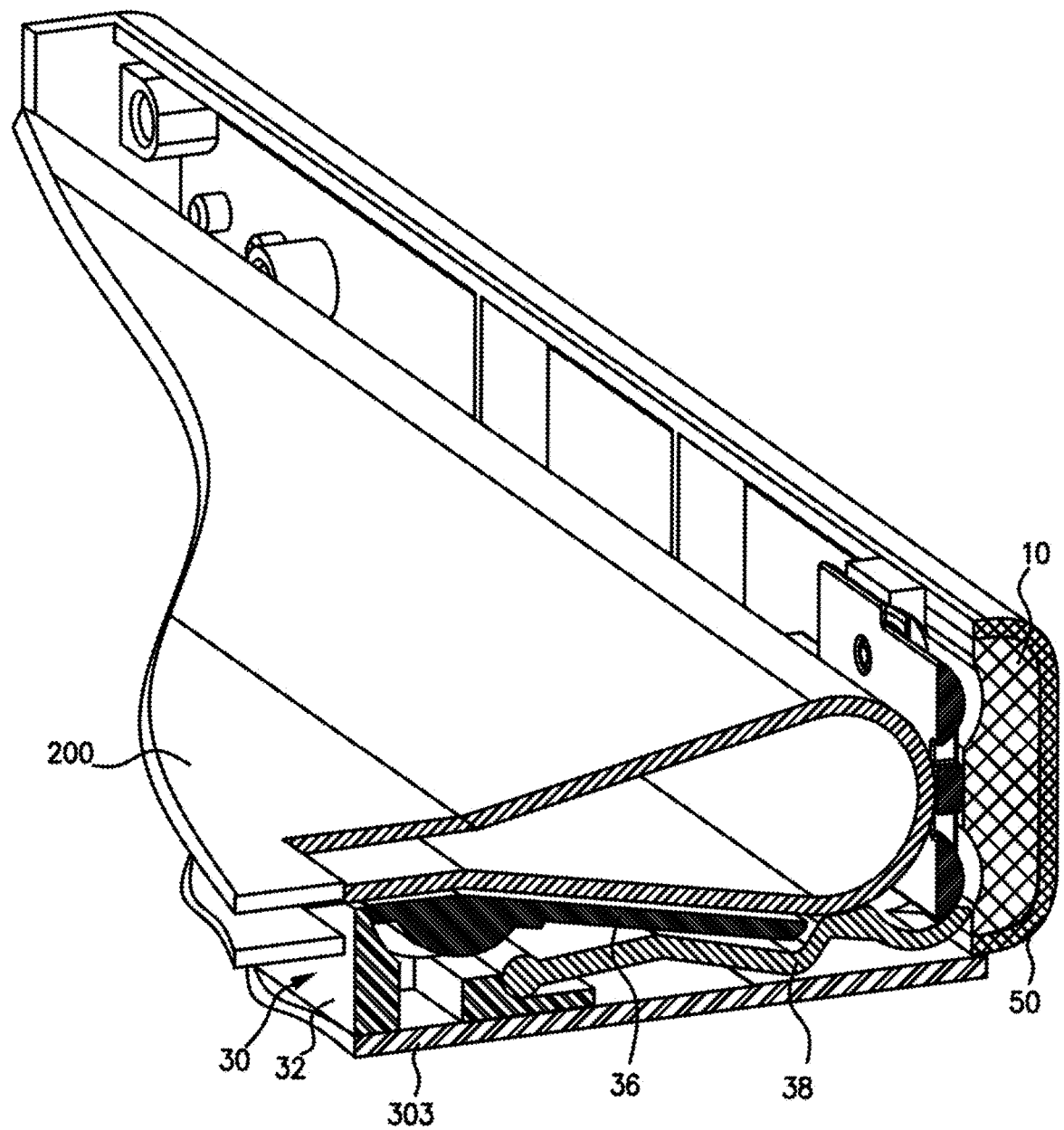
FIG. 13 is a partial schematic perspective cross-sectional view of a partial structure of the electronic device shown in FIG. 1 in a folded state.

In the electronic device and the rotating shaft mechanism thereof provided in the embodiments of the present application, when the foldable screen is provided on the housing assembly and the rotating shaft mechanism, the first housing and the second housing can be rotated relative to each other through the relative rotation between the base and the rotating assembly. At this point, the driving portion slides relative to the guiding portion to drive the guide member to rotate relative to the support, and the guide member deflects when rotating to form a certain avoidance space. The avoidance space can enable the rotating shaft mechanism to avoid generating a resistance force or a support force on the backside of the foldable screen, and can provide a space to accommodate the bending structure created when the foldable screen is folded (as shown in FIG. 13). In this way, a tendency of the foldable screen to deform away from the rotating shaft mechanism can be avoided, e.g., the foldable screen can deform concavely toward the rotating shaft mechanism in a natural bending state without external support for the arching, thereby preventing the foldable screen from deforming in a way that is not in accordance with its bending tendency. Therefore, the above-mentioned rotating shaft mechanism is able to protect the foldable screen when the foldable screen is folded, avoid damage to the foldable screen due to irregular deformation of the foldable screen, and prolong service life of the foldable screen.

In some embodiments, the connecting portion may also be configured to support the foldable screen, so as to prevent the foldable screen from collapsing in the unfolded state. Through the rotating and sliding connection relationship among the guide member, the linkage member, the support and the base, the rotating shaft mechanism can be directly set on the non-display side (i.e., backside) of the foldable screen and can support the foldable screen, to prevent the rotating shaft mechanism from being arranged on the surrounding edges of the foldable screen and occupying a bezel space of the electronic device, which is conducive to achieving a larger screen-to-body ratio.

In embodiments of the present application, the electronic device 500 can be a multipurpose phone that implements a small screen display, or a large screen display, or a bent screen display, and present multiple usage functions. For example, when the flexible display 201 of the electronic device 500 is in a folded state, the first housing 303 can be stacked over the second housing 305, and the electronic device 500 can be used as a cell phone, which is convenient for the user to carry and also occupies little space. When the flexible display 201 of the electronic device 500 is bent at a certain angle, the first housing 303 is unfolded relative to the second housing 305, and is angled relative to each other, the electronic device 500 can be used as a laptop computer. And when the flexible display 201 of the electronic device 500 is unfolded, the first housing 303 is unfolded relative to the second housing 305, and the two are flush with each other, the electronic device 500 can be used as a tablet computer to increase the display area, access to more display content, and improve the user experience. Of course, the electronic device 500 may also be a multipurpose tablet computer, or a multipurpose laptop computer, or other multi-functional electronic devices with multiple switching modes.

Figure 14:
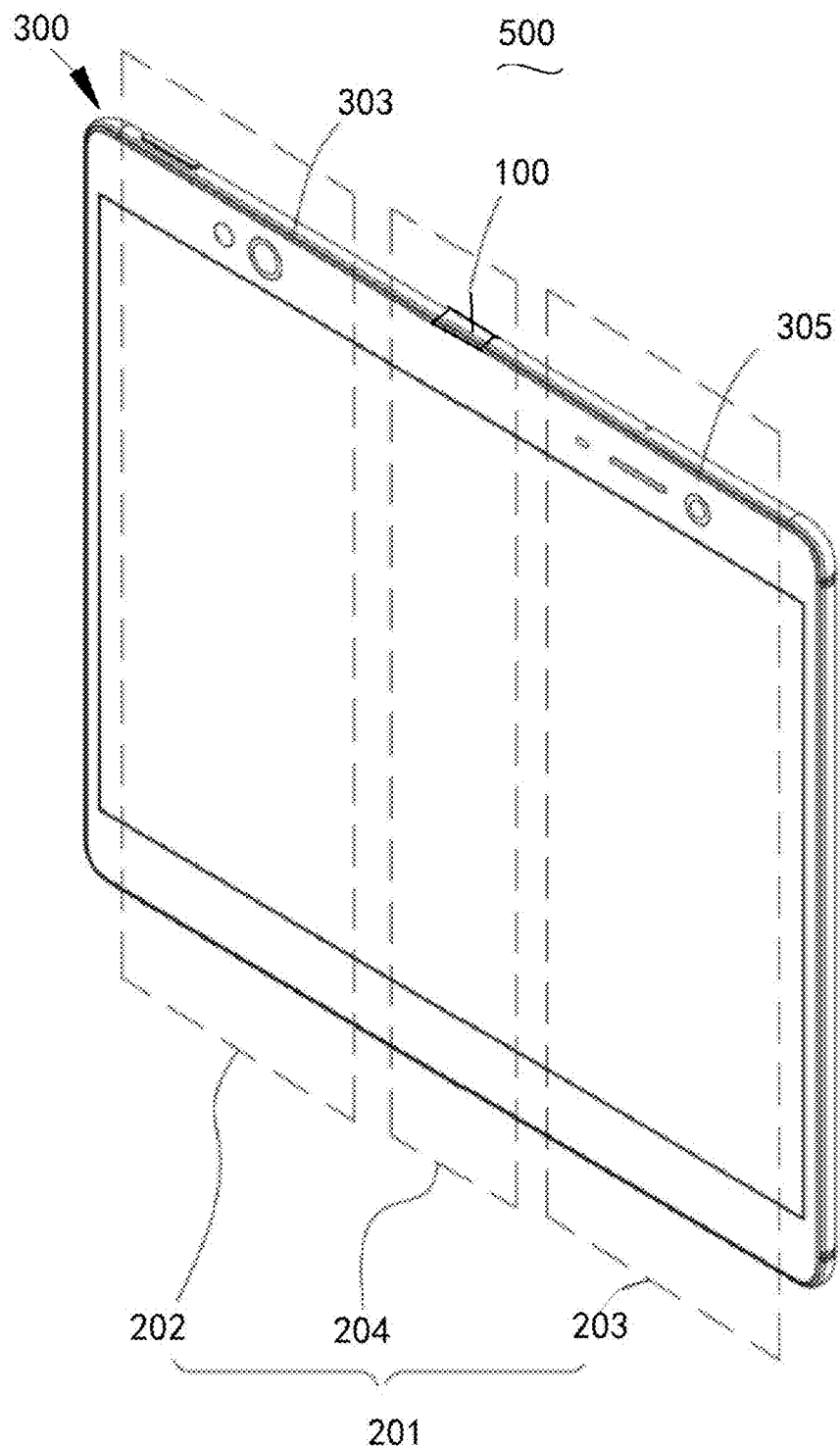
FIG. 14 is a schematic perspective view of the electronic device shown in FIG. 1 in another state.

Referring to FIG. 14, the flexible display 201 in this embodiment includes a first display portion 202 attached to the first housing 303, a second display portion 203 attached to the second housing 305, and a bent display portion 204 connected between the first display portion 202 and the second display portion 203. The first display portion 202 and the second display portion 203 may be folded or unfolded relative to each other, along with the first housing 303 and the second housing 305 respectively. The bent display portion 204 is bent or unfolded as the first display portion 202 is folded or unfolded relative to the second display portion 203. In some embodiments, the first display portion 202, the second display portion 203, and the bent display portion 204 may be of an integral structure so that the flexible display 201 is a whole-piece flexible display. Alternatively, in some other embodiments, the bent display portion 204 is a bendable flexible portion, while the first display portion 202, the second display portion 203 may be a non-flexible portion, and the first display portion 202, and the second display 203 are folded or unfolded relative to each other through the bent display portion 204.

In some embodiments, the foldable screen 200 may further include a flexible light-transmitting cover (not shown in the figures) that covers the flexible display 201. The flexible light-transmitting cover is attached to the flexible display 201. Peripheral edges of the flexible light-transmitting cover are fixedly connected to the first housing 303 as well as the second housing 305. The flexible light-transmitting cover 41 is used to protect the flexible display 201 and to improve the appearance of the electronic device 500.

In the description of this specification, description with reference to the terms "one embodiment", "some embodiments", "an example", or "some examples", etc., means that the specific features, structures, materials or characteristics described in connection with the embodiment or example are included in at least one embodiment or example of the present application. In the present specification, schematic representation of the above terms does not have to be directed to the same embodiment or example. Moreover, the specific features, structures, materials or characteristics as described may be combined in a suitable manner in any one or more embodiments or examples. In addition, without contradicting each other, a person skilled in the art may combine different embodiments or examples described in this specification, as well as the features in the different embodiments or examples.

In addition, the terms "first" and "second" are used for descriptive purposes only and should not be construed as indicating or implying relative importance or implicitly specifying the number of the technical features indicated. Thus, the features defined with "first", "second" may explicitly or implicitly include at least one such feature. In description of the present application, the term "plurality" means at least two, e.g., two, three, etc., unless otherwise expressly and specifically defined.

Finally, it should be noted that the above embodiments are intended only to illustrate technical solutions of the present application, but not to limit them. Though the present application is described in detail with reference to the preceding embodiments, it is understood by those of ordinary skill in the art that it is still possible to modify the technical solutions described in the preceding embodiments, or to replace some of the technical features with equivalent ones. Such modifications or substitutions do not drive the essence of the corresponding technical solutions away from the spirit and scope of the technical solutions of the embodiments of the present application.

The invention claimed is:

1. A rotating shaft mechanism for use in a foldable electronic device, comprising a base and a rotating assembly that are rotatably connected to each other, wherein the rotating assembly comprises:
    a support, spaced apart from the base;
    a linkage member, arranged between the base and the support; wherein the linkage member comprises a body and a driving portion provided at the body, one end of the body being rotatably connected to the base, another end of the body being slidably connected to the support; and a guide member, comprising a connecting portion and a guiding portion, wherein the connecting portion is arranged at one side of the support and is rotatably connected to the support, and the guiding portion is arranged between the connecting portion and the support and is slidably connected to the driving portion of the linkage member.

2. The rotating shaft mechanism as claimed in claim 1, wherein the guiding portion is provided with a sliding groove, the driving portion being at least partially accommodated in the sliding groove; when the rotating assembly rotates relative to the base, the driving portion slides in the sliding groove, and the guide member rotates relative to the support.

3. The rotating shaft mechanism as claimed in claim 2, wherein the guiding portion protrudes relative to a surface of the connecting portion; the sliding groove has a first end and a second end opposite to the first end, the second end being further away from the base than the first end, a distance between the first end and the connecting portion being less than a distance between the second end and the connecting portion; the driving portion is configured to slide between the first end and the second end.

4. The rotating shaft mechanism as claimed in claim 2, wherein the support is provided with a guiding groove, the body comprises a sliding portion, and the sliding portion is slidably arranged in the guiding groove; the driving portion is provided at the sliding portion.

5. The rotating shaft mechanism as claimed in claim 4, wherein the body further comprises another sliding portion, the two sliding portions are arranged opposite to and apart from each other; the guiding portion is arranged between the two sliding portions, and the driving portion is connected between the two sliding portions and passes through the sliding groove.

6. The rotating shaft mechanism as claimed in claim 4, wherein the body further comprises a rotating portion and an avoidance portion, wherein the rotating portion is rotatably connected to the base, the avoidance portion is connected between the rotating portion and the sliding portion, and the avoidance portion is bent relative to the sliding portion to form, together with the sliding portion, an accommodation space for accommodating the connecting portion.

7. The rotating shaft mechanism as claimed in claim 4, wherein the guiding groove runs through one side of the support facing the base to form an opening, the sliding portion of the linkage member passing through the opening; the guiding groove extends in a direction perpendicular to an axis of rotation of the rotating assembly relative to the base.

8. The rotating shaft mechanism as claimed in claim 1, further comprising a connecting member, one end of the connecting member being rotatably connected to the base, another end of the connecting member being rotatably connected to the support.

9. The rotating shaft mechanism as claimed in claim 8, wherein the connecting member is provided side by side with the linkage member; the linkage member is rotatably connected to the base via a first pivot, the connecting member is rotatably connected to the base via a second pivot, wherein the first pivot is arranged coaxially with the second pivot.

10. The rotating shaft mechanism as claimed in claim 8, wherein the guide member is arranged on the same side of the connecting member and the linkage member; the connecting member is provided with an avoidance space at a side facing the guide member, the avoidance space being configured to partially accommodate the guide member.

11. The rotating shaft mechanism as claimed in claim 8, wherein the base comprises a seat and a cover stacked over the seat, wherein the seat is provided with a recess on a side facing the cover, the cover comprises a mating surface facing the recess; the mating surface is arranged opposite to and apart from the surface of the recess to form a pivoting groove together with the recess; one end of the connecting member is slidably accommodated in the pivoting groove.

12. The rotating shaft mechanism as claimed in claim 11, wherein the connecting member comprises a first pivot portion and a positioning portion provided at the first pivot portion, wherein the first pivot portion has an arcuate structure and is slidably arranged in the pivoting groove; the base further comprises a mating portion arranged in the pivoting groove; the positioning portion can selectively embedding fit with the mating portion while the first pivot portion slides in the pivoting groove.

13. The rotating shaft mechanism as claimed in claim 12, wherein the connecting member further comprises a second pivot portion and a transition portion, wherein the transition portion is connected between the first pivot portion and the second pivot portion, the first pivot portion is rotatably connected to the base, the second pivot portion is rotatably connected to the support, and the transition portion has a bent structure for partially accommodating the guide member.

14. The rotating shaft mechanism as claimed in claim 1, further comprising a rotating shaft housing, wherein the rotating shaft housing is provided with an accommodation cavity, the base is arranged in the accommodation cavity and is fixedly connected to the rotating shaft housing.

15. The rotating shaft mechanism as claimed in claim 1, wherein two said rotating assemblies are provided, and the two rotating assemblies are arranged on two opposite sides of the base.

16. A foldable electronic device, comprising:
    a rotating shaft mechanism comprising a base and a rotating assembly that are rotatably connected to each other, wherein the rotating assembly comprises:
        a support, spaced apart from the base;
        a linkage member, arranged between the base and the support; wherein the linkage member comprises a body and a driving portion provided at the body, one end of the body being rotatably connected to the base, another end of the body being slidably connected to the support; and
        a guide member, comprising a connecting portion and a guiding portion, wherein the connecting portion is arranged at one side of the support and is rotatably connected to the support, the guiding portion is arranged between the connecting portion and the support and is slidably connected to the driving portion of the linkage member;
    a first housing, connected to the support;
    a second housing, connected to the base; and
    a foldable screen, connected to the first housing and the second housing, and stacked over the guide member.

17. The foldable electronic device as claimed in claim 16, wherein the foldable screen comprises a first display portion, a second display portion and a bent display portion connected between the first display portion and the second display portion, wherein a non-display side of the bent display portion is connected to the guide member; the first housing and the second housing can be folded or unfolded through relative rotation between the base and the rotating assembly, and the first display portion and the second display portion are stacked over each other when the first housing and the second housing are in a folded state.

18. The foldable electronic device as claimed in claim 16, wherein the first housing is fixedly connected to the support, the second housing is fixedly connected to the base, and the foldable screen is fixedly connected to the guide member.

19. A foldable electronic device, comprising:
- a rotating shaft mechanism comprising a base and two rotating assemblies that are rotatably connected to two opposite sides of the base, respectively, wherein each rotating assembly comprises:
  - a support, spaced apart from the base;
  - a linkage member, arranged between the base and the support; wherein the linkage member comprises a body and a driving portion provided at the body, one end of the body being rotatably connected to the base, another end of the body being slidably connected to the support; and
  - a guide member, comprising a connecting portion and a guiding portion, wherein the connecting portion is arranged at a side of the support and is rotatably connected to the support, the guiding portion is arranged between the connecting portion and the support and is slidably connected to the driving portion of the linkage member;
- a first housing, connected to the support of one of the two rotating assemblies; and
- a second housing, connected to the support of the other one of the two rotating assemblies.

20. The foldable electronic device as claimed in claim 19, further comprising a foldable screen connected to the first housing and the second housing and stacked over the guide member, wherein the foldable screen comprises a first display portion, a second display portion and a bent display portion connected between the first display portion and the second display portion, a non-display side of the bent display portion being connected to the guide member.

* * * * *